United States Patent Office 2,734,913
Patented Feb. 14, 1956

2,734,913

PRODUCTION OF CARBOXYLIC ACID ESTERS BY CARBONYLATION WITH SALTS OF METAL CARBONYL HYDRIDE AND HALOGEN CATALYST

Walter Reppe, Ludwigshafen (Rhine), Nikolaus v. Kutepow, Karlsruhe-Rueppurr, and Eckart Titzenthaler, Ludwigshafen (Rhine), Germany, assignors to Badische Anilin- & Soda-Fabrik Aktiengesellschaft, Ludwigshafen (Rhine), Germany No Drawing. Application August 27, 1952, Serial No. 306,728

Claims priority, application Germany September 14, 1951

9 Claims. (Cl. 260—488)

The present invention relates to the production of carboxylic acid esters, and in particular to a method of producing such esters by the carbonylation of aliphatic alcohols with carbon monoxide in the presence of specific catalysts.

It is known that carbonylation of alcohols with carbon monoxide at elevated temperature and under superatmospheric pressure leads to carboxylic acids and their esters. Preferred catalysts for this carbonylation have been metals capable of forming metal carbonyls, such as nickel or cobalt, or their compounds. The activity of such catalysts may be substantially improved by the presence of halogen either in elemental or combined form (see Walter Reppe, "Neue Entwicklungen auf dem Gebiet der Chemie des Acetylens und Kohlenoxyds," Springer-Verlag, 1949).

It has now been found, and this constitutes the subject of our invention, that by using novel specific catalysts we may reduce the optimal reaction temperature substantially. These novel catalysts are the salts of metal carbonyl hydrides. We prefer to use the salts of cobalt or iron carbonyl hydride. The most active salts of this type are those derived from cobalt carbonyl hydride and in particular the salts of metals of the sub-groups I and II of the periodic system, viz. silver, zinc, cadmium or mercury. The preferred catalysts in our invention are the mercury and silver salts of cobalt carbonyl hydride.

In carrying out the reaction these catalysts may be used in an amount of 0.5 to 5 per cent, calculated on the weight of the alcohol to be carbonylated. In addition to these catalysts we also use as activating agents halogen either in an elemental or in a combined form. Bromine and iodine are the preferred halogens; the activity of iodine and its compounds, such as hydrogen iodide and its salts, or alkyl iodides, such as methyl or butyl iodide, is more marked than that of the corresponding bromine derivatives. The amount of these activating agents is catalytical which means that it is not necessary to use these activators in an equivalent amount to the alcohol. Generally speaking, an amount of less than 5, preferably less than 1 per cent, of halogen is sufficient.

In using the above mentioned salts of metal carbonyl hydrides as catalysts, the reaction proceeds more or less exclusively with the formation of carboxylic acid ester. In most cases the reaction product is entirely free from acid. This specific result of the use of these catalysts is highly desirable because it is possible to work in high pressure equipment made from normal construction material, whereas in most known carbonylations of alcohols highly acid resistant equipment had to be used.

As a by-product small amounts of aldehydes and, apparently by reduction thereof, small amounts of alcohols, containing one carbon atom more than the starting alcohol, have been observed. Thus, in carbonylating methanol small amounts of ethanol could be determined. Otherwise the alcohol used as starting material is hardly used for by-reactions. Since it is preferable to carry out the reaction with an incomplete conversion of the alcohol, it is possible to use the unconverted part of the starting material again.

As mentioned above an advantage of the novel catalysts resides in the fact that the reaction temperature may be markedly lower than that hitherto believed necessary. We prefer to carry out the reaction at temperatures between 140 and 200° C., in particular 160 and 190° C. It is possible to carry out the reaction at higher temperatures, say between 200 and 250° C., with good success. Another advantage consists in that the novel catalysts are not converted into free metal carbonyl which would be taken out by the reaction products, but remains unchanged.

The reaction is carried out, as it is conventional, under superatmospheric pressures. For practical consideration we prefer to work under pressures exceeding 50 atmospheres, in particular between 150 and 250 atmospheres. Higher pressures, such as 300, 500 or 900 atmospheres, may also be used if a corresponding pressure resistant equipment and compressors are available. As reaction vessels we may use autoclaves or high pressure tubes made from steel and lined with copper or similar material.

The reaction may be carried out by using the alcohol as a solvent. However, additional solvents, such as esters, ethers, hydrocarbons, acetals and the like may be used. The reaction may be carried out discontinuously in an autoclave. It also may be carried out continuously by leading the liquid alcohol through a vertical high pressure tube upwards in direct current with the carbon monoxide together with catalysts, or by allowing the alcohol to trickle through a vertical tube containing filler bodies charged with catalyst, while leading the carbon monoxide in direct or countercurrent with the reaction liquid. Both the alcohol and the carbon monoxide may be circulated.

The following examples will further illustrate how our invention may be carried out in practice. The parts are by weight.

*Example 1*

In a shaking autoclave made from stainless steel a mixture of 60 parts of methanol, 1 part of the mercury salt of cobalt carbonyl hydride $Hg[Co(CO)_4]_2$ and 0.1 part of iodine is charged with carbon monoxide under 50 atmospheres normal pressure. The autoclave is then heated while shaking to 180° C., while increasing the carbon monoxide pressure to 200 atmospheres and maintaining it at this level by constantly replenishing the carbon monoxide. After about 30 hours carbon monoxide is no longer absorbed. The reaction liquid (76 parts) is distilled. 30 parts of methyl acetate, 1 part of acetaldehyde, a small amount of ethanol and the balance of unconverted methanol are thus obtained.

After having distilled off the methyl acetate, the unconverted methanol may be again submitted to the reaction in the presence of the unchanged catalyst.

*Example 2*

In the manner described in the preceding example 300 parts of methanol, 10 parts of $Hg[Co(CO)_4]_2$ and 1 part of iodine are charged with carbon monoxide in a rotating autoclave. The reaction time is 45 hours. 373 parts of a liquid are obtained which consists of 170 parts of methyl acetate, 1 part of acetaldehyde, a small amount of ethanol and the balance of unconverted methanol.

Instead of methanol we may also use its higher homologues, e. g. ethanol, the propanols and butanols or even higher fatty alcohols.

*Example 3*

100 parts of 95 per cent ethyl alcohol, 0.2 part of iodine and 3 parts of Hg[Co(CO)$_4$]$_2$ are charged in a shaking autoclave of stainless steel. Carbon monoxide is pressed in at a pressure of 70 atmospheres. The autoclave is heated to 180° C. while shaking, the pressure is increased to 200 atmospheres by pressing on carbon monoxide and maintained at this level for 24 hours by constantly pressing on carbon monoxide. The output amounts to 90 parts containing 13 parts of ethyl propionate and 4 parts of propionic acid in addition to unreacted alcohol. At the end of the reaction about 12 per cent of the alcohol have been converted into ethyl propionate.

*Example 4*

To a shaking autoclave made from stainless steel containing 56 parts of 90% aqueous methanol, 4 parts of the silver salt of cobalt carbonyl hydride Ag[Co(CO)$_4$] and 0.4 part of iodine carbon monoxide is charged under a pressure of 70 atmospheres. The autoclave is heated to 180° C. while shaking and increasing the carbon monoxide pressure to 200 atmospheres. This pressure is maintained for 24 hour. 73 parts of a reaction product are obtained. By distillation it yields 31 methyl acetate, 12 parts of acetic acid, 1.7 parts of acetaldehyde and 10 parts of uncharged methanol. The catalyst is formed in the distillation residue and may be used repeatedly.

We claim:

1. In the production of carboxylic acid esters by the interaction of aliphatic alcohols with carbon monoxide at elevated temperature and under superatmospheric pressure the step which comprises carrying out the reaction in the presence of a salt derived from a metal carbonyl hydride, selected from the class consisting of the silver, zinc, cadmium and mercury salts of cobalt and iron carbonyl hydrides, and a catalytic amount of halogen.

2. The production of carboxylic acid esters as set forth in claim 1, wherein the mercury salt of cobalt carbonyl hydride is used as the catalyst.

3. The production of carboxylic acid esters as set forth in claim 1, wherein the silver salt of cobalt carbonyl hydride is used as the catalyst.

4. In the production of carboxylic acid esters by the interaction of aliphatic alcohols with carbon monoxide at elevated temperature and under superatmospheric pressure the step which comprises carrying out the reaction in the presence of the mercury salt of cobalt carbonyl hydride and a catalytic amount of a halogen, selected from the halogens bromine and iodine.

5. The production of carboxylic acid esters as set forth in claim 4, wherein elemental iodine is used.

6. A process for the production of methyl acetate which comprises treating methanol with carbon monoxide at temperature between 140° C. and 200° C. and under a pressure exceeding 50 atmospheres in the presence of the mercury salt of cobalt carbonyl hydride as catalyst and a catalytic amount of elemental iodine.

7. In the production of carboxylic acid esters by the interaction of aliphatic alcohols with carbon monoxide at elevated temperature and under superatmospheric pressure the step which comprises carrying out the reaction in the presence of the silver salt of cobalt carbonyl hydride and a catalytic amount of a halogen, selected from the halogens bromine and iodine.

8. The production of carboxylic acid esters as set forth in claim 7, wherein elemental iodine is used.

9. A process for the production of methyl acetate which comprises treating methanol with carbon monoxide at temperatures between 140° C. and 200° C. and under a pressure exceeding 50 atmospheres in the presence of the silver salt of cobalt carbonyl hydride as catalyst and a catalytic amount of elemental iodine.

References Cited in the file of this patent

UNITED STATES PATENTS 2,542,767    Gresham ---------------- Feb. 20, 1951

OTHER REFERENCES

Acetylene Chemistry, Reppe, P. B. Report 18852–5, Meyer and Co., N. Y. (1949), pg. 178.